(12) United States Patent
Kim et al.

(10) Patent No.: US 9,401,139 B2
(45) Date of Patent: Jul. 26, 2016

(54) MOBILE TERMINAL AND CONTROLLING METHOD THEREOF

(71) Applicant: LG ELECTRONICS INC., Seoul (KR)

(72) Inventors: Taejun Kim, Seoul (KR); Yunae Nam, Seoul (KR)

(73) Assignee: LG ELECTRONICS INC., Seoul (KR)

(*) Notice: Subject to any disclaimer, the term of this patent is extended or adjusted under 35 U.S.C. 154(b) by 282 days.

(21) Appl. No.: 14/012,732

(22) Filed: Aug. 28, 2013

(65) Prior Publication Data

US 2014/0088955 A1 Mar. 27, 2014

(30) Foreign Application Priority Data

Sep. 24, 2012 (KR) .................. 10-2012-0105683

(51) Int. Cl.
*G10L 13/08* (2013.01)
*H04M 1/725* (2006.01)

(52) U.S. Cl.
CPC ......... *G10L 13/086* (2013.01); *H04M 1/72522* (2013.01)

(58) Field of Classification Search
CPC .......... G06F 13/016; G06F 2203/0381; G10L 13/027; G10L 13/00; G10L 13/02
USPC ............................................. 704/260
See application file for complete search history.

(56) References Cited

U.S. PATENT DOCUMENTS

| | | | |
|---|---|---|---|
| 6,324,511 B1 * | 11/2001 | Kiraly | G09B 21/006 704/260 |
| 7,200,560 B2 | 4/2007 | Philbert | |
| 2006/0177003 A1 * | 8/2006 | Keyhl | G10L 25/69 379/27.01 |
| 2007/0094029 A1 * | 4/2007 | Saito | G10L 13/033 704/260 |
| 2008/0019122 A1 * | 1/2008 | Kramer | A47G 19/025 362/154 |
| 2008/0058894 A1 * | 3/2008 | Dewhurst | G09B 21/007 607/54 |
| 2009/0164207 A1 * | 6/2009 | Makela | G06F 3/038 704/9 |
| 2009/0167704 A1 * | 7/2009 | Terlizzi | G06F 3/016 345/173 |
| 2010/0152600 A1 * | 6/2010 | Droitcour | A61B 5/05 600/534 |
| 2010/0188327 A1 * | 7/2010 | Frid | G06F 3/016 345/156 |
| 2010/0238116 A1 * | 9/2010 | Shin | G06F 3/016 345/168 |

(Continued)

FOREIGN PATENT DOCUMENTS

| | | |
|---|---|---|
| CN | 1584979 | 2/2005 |
| CN | 101896803 | 11/2010 |

OTHER PUBLICATIONS

The State Intellectual Property Office of the People's Republic of China Application Serial No. 201310453278.X, Office Action dated Dec. 25, 2015, 7 pages.

*Primary Examiner* — Jakieda Jackson
(74) *Attorney, Agent, or Firm* — Lee, Hong, Degerman, Kang & Waimey PC; Jonathan Kang; Justin Lee

(57) ABSTRACT

A mobile terminal and controlling method thereof are disclosed, by which a feedback matching a meaning of a natural language is outputted in the course of outputting a sound corresponding to the natural language by sentence unit. The present invention includes a display unit configured to display a text by sentence unit, an audio output module configured to output a synthetic sound generated from converting the text to a sound, and a controller configured to generate the synthetic sound, extract a meaning of the text, and control a feedback matching the meaning of the text to be outputted while the synthetic sound is outputted via the audio output module.

8 Claims, 12 Drawing Sheets

(56) References Cited

U.S. PATENT DOCUMENTS

| | | | | |
|---|---|---|---|---|
| 2011/0201387 A1* | 8/2011 | Paek | ................... | G06F 3/0237 455/566 |
| 2012/0123784 A1* | 5/2012 | Baker | ................... | G09B 21/002 704/270 |
| 2012/0229264 A1* | 9/2012 | Company Bosch | ..... | G06F 3/016 340/407.1 |
| 2012/0256858 A1* | 10/2012 | Sudo | ....................... | G06F 3/016 345/173 |
| 2014/0068449 A1* | 3/2014 | Wolfram | ................ | G06F 3/048 715/738 |

\* cited by examiner (a)

(b)

MOBILE TERMINAL AND CONTROLLING METHOD THEREOF

Pursuant to 35 U.S.C. §119(a), this application claims the benefit of earlier filing date and right of priority to Korean Application No. 10-2012-0105683, filed on Sep. 24, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for outputting a feedback matching a meaning of a natural language in the course of outputting a sound corresponding to the natural language by sentence unit.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, a speech output function of outputting a sound corresponding to text information displayed on a display unit of a mobile terminal is added to the mobile terminal in order to enhance convenience of a mobile terminal user. Owing to the speech output function, the user of the mobile terminal is able to easily recognize a content displayed on the display unit without watching the display unit.

However, since a speech output function of a related art is only capable of reading a text displayed on a display unit in a speech, it cause a problem in being utilized as an means appropriate for delivering lively information to a user.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be further enhance.

In particular, an object of the present invention is to provide a mobile terminal and controlling method thereof, by which a feedback matching a meaning of a prescribed text can be outputted in the course of outputting a synthetic sound generated from converting the prescribed text to a sound via the mobile terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display unit configured to display a text by sentence unit, an audio output module configured to output a synthetic sound generated from converting the text to a sound, and a controller configured to generate the synthetic sound, extract a meaning of the text, and control a feedback matching the meaning of the text to be outputted while the synthetic sound is outputted via the audio output module.

In another aspect of the present invention, a method of controlling a mobile terminal according to the present invention may include the steps of displaying a text by sentence unit, generating a synthetic sound from converting the text to a sound, extracting a meaning of the text, determining a feedback matching the meaning of the text, outputting the synthetic sound, and outputting the feedback while the synthetic sound is outputted.

Preferably, the feedback may include a background sound utilized as a background sound of the synthetic sound or an image file matching the meaning of the text.

Preferably, the feedback may be adjusted in a manner of changing an output color of the display unit or adjusting a brightness of the display unit.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
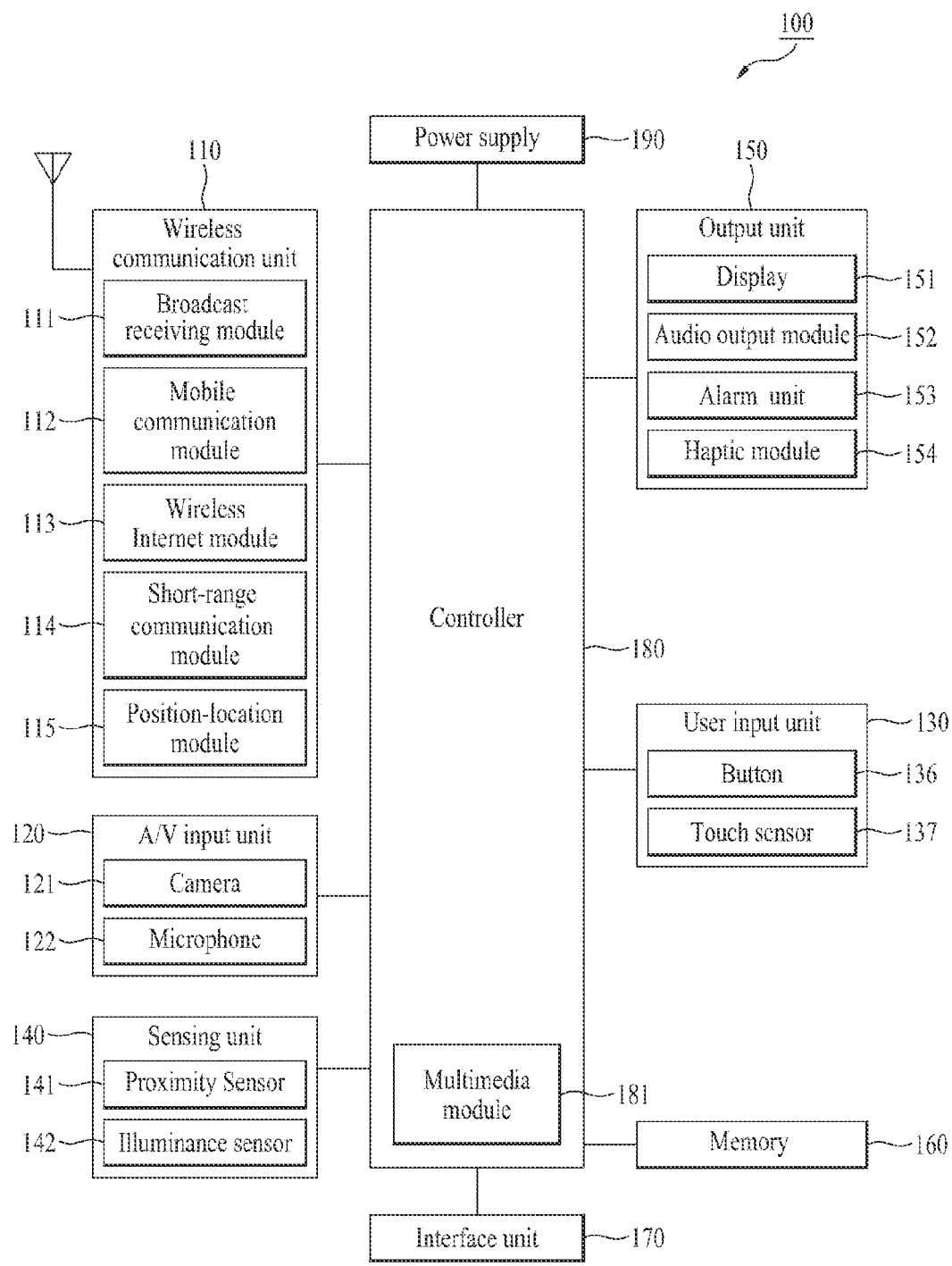
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
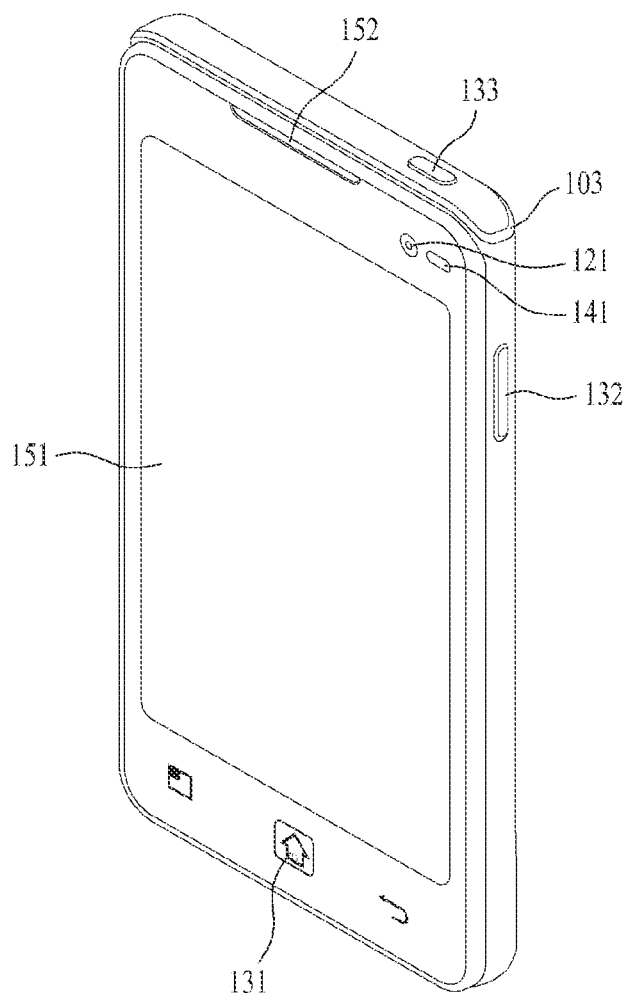
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 3:
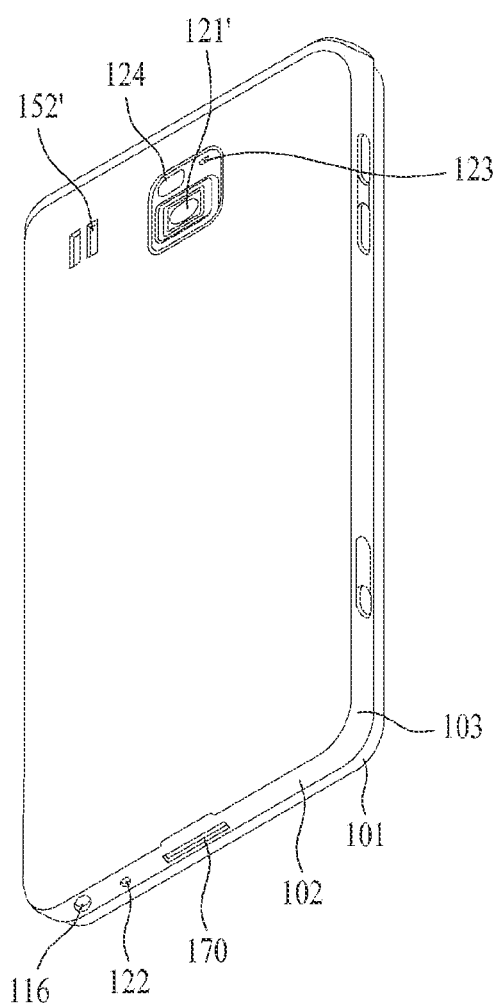
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

For clarity of the following description, assume that a mobile terminal 100 according to the present invention may include at least one of the former components shown in FIG. 1. In particular, the mobile terminal 100 according to the present invention is assumed as including the display unit 151, the audio output module 152, the memory 160 and the controller 180 shown in FIG. 1. Occasionally, the mobile terminal 100 according to the present invention may further include the wireless communication unit and the camera among the components shown in FIG. 1.

Moreover, the controller 180 of the present invention may include a TTS (text-to-speech) module (not shown in FIG. 1), a natural language processing module (not shown in FIG. 1) and a feedback estimating module (not shown in FIG. 1).

The TTS module converts a natural language displayed on the display unit 151 to a speech and then delivers the speech to the audio output module 152. In particular, the TTS module directly converts a natural language to a sound and then delivers the sound to the audio output module 152. The TTS module of the present invention creates a synthetic sound by automatically analyzing a natural language by a sentence unit and may be then able to deliver the created synthetic sound to the audio output module 152. When a natural language is displayed on the display unit 151, it may be displayed as a text string combined text.

The natural language processing module is configured to convert a human-uttered language phenomenon into a computer-understandable form by mechanically analyzing the language phenomenon. The natural language processing module analyzes a human language by performing morphological analysis, phrase unit analysis, parsing and the like and is then able to output a compiler language having a meaning of a natural language. The natural language processing module of the present invention analyzes a meaning of a natural language by a sentence unit and is then able to analyzed meaning of the natural language.

Regarding the natural language processing unit, the morphological analysis may mean to output all possible analysis results of any target word. In particular, the natural language processing module may be able to select a proper result from a number of all occasions, in which a word can be divided, using table parsing. The phrase unit analysis may mean to analyze a noun phrase, a verb phrase, adverbial phrase and the like. And, a clause unit analysis may mean to disassemble such a sentence as a compound sentence, a complex sentence and the like by a short sentence. The parsing may mean to determine a structure of a sentence by disassembling a sentence into components constructing the corresponding sentence and then analyzing a hierarchical relation therein.

The feedback estimating module is configured to determine a feedback matching a meaning of a natural language outputted from the natural language processing module. The feedback estimating module may include at least one of a background sound estimating module, a vibration determining module, a display determining module and a light source determining module. The background sound estimating module is configured to determine audio data matching a meaning of a natural language. And, the vibration determining module is configured to determine whether to output a vibration in response to a meaning of a natural language. Likewise, the display determining module is configured to determine whether to change an output of the display unit 151 in response to a meaning of a natural language. And, the light source determining module may be configured to determine whether to flicker a light source in response to a meaning of a natural language.

Based on the above-described contents, the mobile terminal 100 according to the present invention is described in detail as follows.

Figure 4:
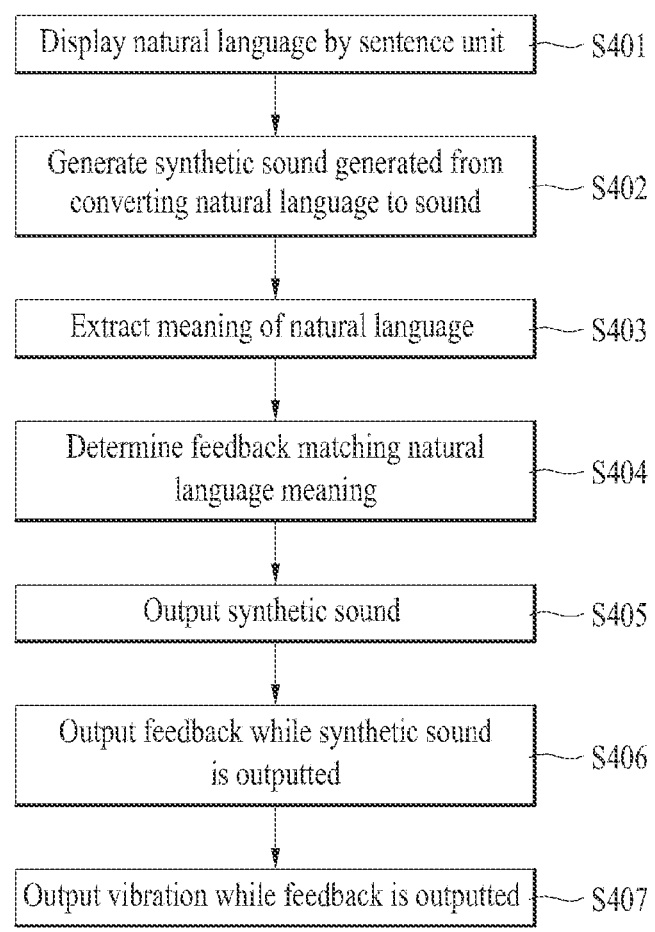
FIG. 4 is a flowchart for an operation of a mobile terminal according to one embodiment of the present invention.

FIG. 4 is a flowchart for an operation of a mobile terminal according to one embodiment of the present invention.

Referring to FIG. 4, the controller 180 may be able to control a natural language of a sentence unit to be displayed on the display unit 151 [S401]. A sentence is a minimum unit to indicate a complete content when a human thought or feeling is represented into a language and is generally constructed with a subject and a verb. Yet, it may be unnecessary for a sentence to be constructed with a subject and a verb. For instance, such an onomatopoeic word having a subject and verb omitted as 'bowwow', 'ding-dong' and the like may construct a sentence. For another instance, a sentence (e.g., 'Really?') without a verb can construct a sentence, too. In the step S401, the controller 180 may control a natural language to be outputted in a manner of outputting an e-book, a document file, a webpage, a text-entered image file and the like to the display unit 151. In case of extracting a natural language from an image file, the controller 180 may be able to extract the natural language from the image file using a text recognition algorithm.

Once the natural language of the sentence unit is displayed on the display unit 151, the TTS module of the controller 180 is able to control a synthetic sound to be generated from converting the natural language to a sound by performing TTS analysis on the natural language of the sentence unit [S402]. Moreover, the natural language processing module of the controller 180 may be able to extract a meaning of the natural language by analyzing the natural language of the sentence unit [S403].

Once the meaning of the natural language is analyzed, the feedback determining module of the controller 180 may be able to determine a feedback that matches the meaning of the natural language [S404]. In particular, the feedback may be represented as at least one of an output of a background sound, a display of an image, an output change of the display unit 151, an output of vibration and a flickering of a light source. In the following description, examples of a natural language outputted to the display unit 151 and a process for outputting a feedback in response to a meaning of the natural language are explained in detail.

[Example of Feedback: Background Sound]

The controller 180 may be able to determine a background sound matching a natural language meaning as a feedback. In this case, the background sound may play a role in supporting a synthetic sound while the synthetic sound is outputted via the audio output module 152. In particular, the controller 180 may be able to extract a background sound matching a natural language meaning from a background sound database saved in the memory 160. Examples of determining a feedback are described in detail with reference to detailed examples of natural languages as follows.

<Natural Language Example 1: Rain Will Come this Weekend.>

Since a subject 'rain' takes an action of a verb 'come' in the meaning of the example 1, the controller 180 may be able to extract a background sound matching the meaning of 'rain comes' in the example 1 from a background sound database. In particular, the controller 180 extracts a background sound corresponding to a raining sound from the background database and is then able to use it as a feedback.

<Natural Language Example 2: Heavy Rain Accompanied by Strong Wind is Expected.>

In the meaning of the example 2, a subject 'heavy rain' takes an action of a verb 'expected' and an object 'strong wind' takes an action of a verb 'accompanied'. So to speak, in the meaning of the example 2, the meaning 'strong wind blows' and the meaning 'heavy rain comes' are synthesized with each other. Hence, the controller 180 extracts a background sound representing a wind sound matching the meaning of 'strong wind blows' and a background sound representing a raining sound matching the meaning of 'heavy rain comes' from the background sound database and is then able to use the extracted background sounds as a feedback.

As mentioned in the above descriptions with reference to the natural language examples 1 and 2, the controller 180 of the present invention may be able to control a background sound matching a meaning of a natural language to be determined as a feedback. Yet, in case that it is unable to extract a background sound matching a meaning of a natural language from the background sound database, it may be unable to use the background sound as a feedback.

Furthermore, the controller 180 may not output a feedback if a meaning of a sentence relates to negation or non-existence. This is described with reference to the following example.

<Natural Language Example 3: A Chance of Rain is not Present this Weekend Once in a while.>

The meaning of the example 3 is to announce a non-existence (i.e., 'is not present') of 'chance of rain'. In particular, the meaning of the example 3 may be regarded as having a negative meaning of 'a rain will not come'. Hence, on the contrary to the former description with reference to the natural language example 1, the controller 180 may not extract a background sound corresponding to a raining sound from the background sound database. In particular, in the example 3, the controller 180 may be able to control a background sound not to be outputted to coincide with the meaning of the natural language.

Like the natural language example 3, the controller 180 of the present invention does not determine a feedback per keyword of a sentence but may be able to control a feedback to be determined in accordance with a whole meaning of the sentence. In particular, even if the keyword 'rain' is contained in the sentence of the natural language example 3, it is not mandatory for 'raining sound' to be determined as a feedback.

[Example of Feedback: Vibration]

The controller 180 may be able to control a vibration to be outputted as a feedback in accordance with a meaning of a natural language. In particular, in case that the meaning of the natural language relates to shaking, vibration, shock, breakage, damage or the like, the controller 180 may control a vibration to be outputted as a feedback. A process for outputting a vibration as a feedback is described in detail with reference to a detailed example of a natural language as follows.

<Natural Language Example 4: Bus is Heavily Shaking on Running on an Unpaved Road in the Countryside.>

The meaning of the example 4 indicates that a subject 'bus' performs an action 'running' and an action 'shaking'. The controller 180 may control a vibration to be outputted as a feedback matching the meaning 'bus is shaking' in the meaning of the example 4. In particular, like the meaning of the example 4, in order to give a haptic effect as if a bus is running on an unpaved road, the controller 180 may control a vibration to be outputted via the mobile terminal 100.

<Natural Language Example 5: He Punched Hard on a Front Door with Fist>

The meaning of the example 5 indicates that a subject 'he' performs an action of 'punch' on an object 'front door' using a complement 'fist'. Like the example 5, if a meaning of a sentence contains a meaning of applying a shock to a specific target, the controller 180 may control a vibration to be outputted as a feedback. In the example 5, in order to give an effect as if a first hits a front door, the controller 180 may control a vibration to be outputted via the mobile terminal 100.

[Example of Feedback: Image]

The controller 180 may control an image to be outputted as a feedback in accordance with a meaning of a natural language. In particular, the controller 180 may be able to extract an image matching a natural language meaning from an image database saved in the memory 160. A case of outputting an image as a feedback is described with reference to detailed examples of a natural language as follows.

<Natural Language Example 6: Baseball Flown Far Broke a Next-Door Window.>

The meaning of the example 6 indicates that a subject 'baseball' performs an action of 'break' on an object 'next-door window'. In particular, the meaning of the example 6 may be understood as including a meaning that such a target as a glass is broken. Hence, the controller 180 extracts an image, which can match a meaning 'glass is broken' in the example 6, from an image database and is then able to determine the extracted image as a feedback. For instance, referring to FIG. 5, the controller 180 may be able to control an image, which represents 'broken glass' matching the meaning of the example 6, to be outputted as a feedback on the display unit 151. In the example shown in FIG. 5, the controller 180 may control the image determined as the feedback to configure a background image while a natural language is outputted via the display unit 151.

<Natural Language Example 7: Large Snowflakes were Falling Down Hard Outside a Window.>

The meaning of the example 7 indicates that a subject 'snowflakes' performs an action of 'fall down'. In particular, the meaning of the example 7 may be understood as including the meaning of 'snow falls down'. Hence, the controller 180 extracts an image, which can match a meaning 'snow falls down' in the example 7, from an image database and is then able to determine the extracted image as a feedback. For instance, referring to FIG. 6, the controller 180 may control an image, which represents a snowing scenery, to be outputted as a feedback to match the meaning of the example 7.

Figure 5:
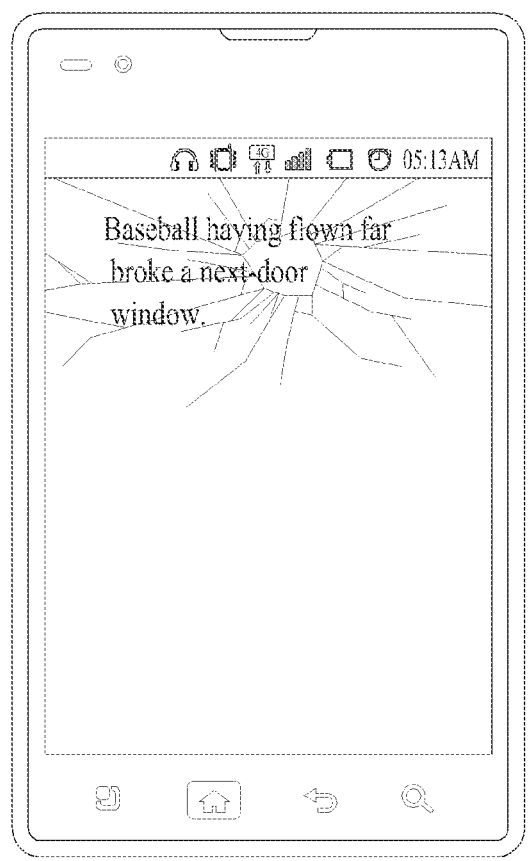
FIG. 5 is a diagram for one example to describe a process for outputting am image corresponding to a feedback.
Figure 6:
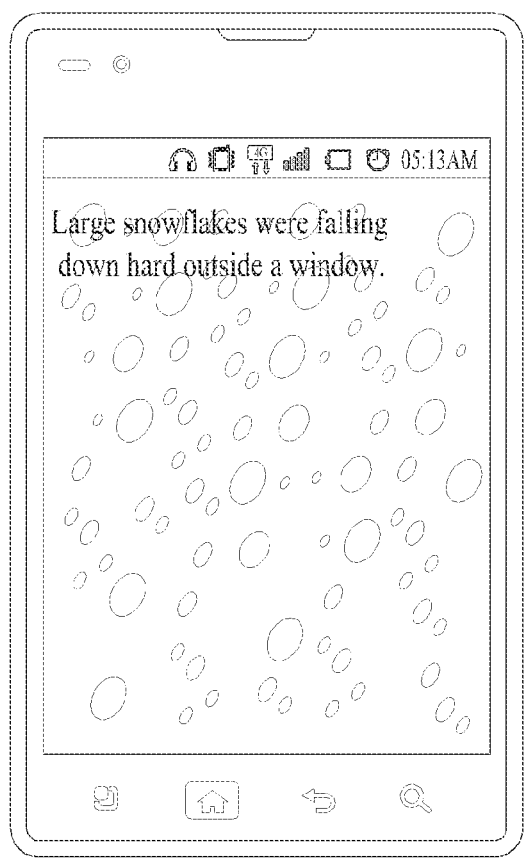
FIG. 6 is a diagram for another example to describe a process for outputting an image corresponding to a feedback.

In case that a feedback is outputted as a background of a natural language, as shown in FIG. 5 or FIG. 6, the controller 180 may be able to control a letter color of the natural language to clearly contrast with a color of a background image. This is, in case that the letter color of the natural language is similar to that of the background image at a natural language displayed position, to prevent a problem of the degraded visibility of the natural language due to the background image. In particular, in case of determining that the color of the natural language is similar to that of the background image outputted as the feedback, the controller 180 may be able to control the letter color of the natural language to be displayed in a manner of being changed into a second color from a first color while the feedback is outputted to the display unit 151. The second color may include a complementary color with the first color or the color of the background image at the natural language displayed position, which may not be mandatory. If the letter color of the natural language is changed into the second color from the first color, it may be able to secure visibility of the displayed natural language while the image is displayed as the feedback.

Furthermore, it may be unnecessary for the image used as the feedback to include a still image. For instance, the controller 180 may be able to use a moving image or video as a feedback.

[Example of Feedback: Change of Brightness or Color of Display Unit 151]

The controller 180 may be able to control a brightness or color of the display unit 151 to be changed as a feedback in accordance with a meaning of a natural language. In particular, for instance, if the meaning of the natural language relates to such a change of brightness as a change of night/day, On/Off of an electric instrument and the like, the controller 180 may control a feedback matching the meaning of the natural language to be outputted by changing the brightness of the display unit 151. For another instance, if the meaning of the natural language relates to a specific color, the controller 180 may control a feedback to be outputted by outputting the specific color via the display unit 151. A process for outputting a feedback by a brightness or color change of the display unit 151 is described in detail with reference to the detailed examples of a natural language as follows.

<Natural Language Example 8: Darkness was Already Coming Down Dimly in the Deep Valley.>

The meaning of the example 8 indicates that an object 'darkness' performs an action of 'coming down'. In particular, the example 8 may be understood as including the meaning of 'darken'. Hence, in order to represent the meaning 'darken', the controller 180 may be able to control a brightness level of the display unit 151 to be gradually lowered.

<Natural Language Example 9: Sun Rose after the Thick and Dark Clouds have Lifted.>

The meaning of the example 9 includes that an object 'sun' performs an action 'rise'. In particular, the example 9 may be understood as including the meaning 'sun rises'. Hence, in order to represent the meaning 'sun rises', the controller 180 may be able to control a brightness level to be gradually raised.

<Natural Language Example 10: He Dyed the Cloth Yellow.>

The meaning of the example 10 includes that a subject 'he' performs an action of a verb 'dye' on a complement 'cloth'. In particular, the example 10 may be understood as including the meaning 'cloth changed into yellow'. Hence, the meaning 'changed into yellow' can be represented in a manner of changing a color of the display unit 151 into yellow gradually.

[Example of Feedback: Flickering of Light Source Unit]

As mentioned in the foregoing description, the mobile terminal 100 according to the present invention may represent a change of a brightness by adjusting a brightness of the display unit 151. Alternatively, the mobile terminal 100 according to the present invention may represent a change of a brightness by flickering of the light source unit. In this case, the light source unit may include at least one of a camera flash used to supplement a light of photographing and a backlight LED provided to a backside of a keypad. A process for outputting a feedback via flickering of a light source unit is described in detail with reference to a detailed example of a natural language as follows.

<Natural Language Example 11: Lightning Struck with a Flash as Soon as Dark Clouds Gathered.>

A natural language of the example 11 includes the meaning that a subject 'lightning' performs an action of a verb 'strike. To match the meaning 'lightning struck' of the example 11, the controller 180 may be able to control a feedback to be outputted in a manner that the light source unit flickers.

In the above-mentioned examples, the examples of the feedback include the background sound, the vibration, the image, the brightness change of the display unit 151, the color change of the display unit 151 and the flickering of the light source unit. It is not mandatory for the feedback to be determined as one of the above-enumerated examples. For instance, the feedback may be determined as a combination of at least two of the above-enumerated examples. In particular, the feedback may include at least one of the background sound, the vibration, the image, the brightness change of the display unit 151, the color change of the display unit 151 and the flickering of the light source unit.

For instance, from a natural language 'Thunder and lightning struck with tremendous sound', the controller 180 may control a feedback to be outputted in one of various forms including a background sound corresponding to a thunder sound, an image representing a thunderbolt hit, a change of a brightness or color of a display instantly to represent a thunderbolt hit, a flickering of a light source unit and the like.

Referring now to FIG. 4, the controller 180 controls a synthetic sound converted from the natural language to be outputted via the audio output module 152 [S405] and is also able to control a feedback to be outputted while the synthetic sound is outputted [S406]. By controlling the feedback matching the meaning of the natural language to be outputted in the course of outputting the synthetic sound converted from the natural language, the controller 180 may be able to control a user to understand the meaning of the natural language more easily.

In controlling the feedback to be outputted in the course of outputting the synthetic sound via the audio output module 152, the controller 180 may be able to adjust an output time of the feedback based on a presence or non-presence of a core word (e.g., keyword) corresponding to the feedback in the natural language or the play times of the synthetic sound and the feedback.

A process for adjusting an output time of a feedback is described in detail with reference to the detailed examples as follows.

[Feedback Output Timing Point Example 1: Outputting Feedback to Match an Output of a Core Word]

In case that a core word corresponding to a feedback exists, the controller 180 may be able to control the feedback to be outputted to match an output timing point of the core word in a synthetic sound. This is described in detail with reference to FIG. 7 as follows.

Figure 7:
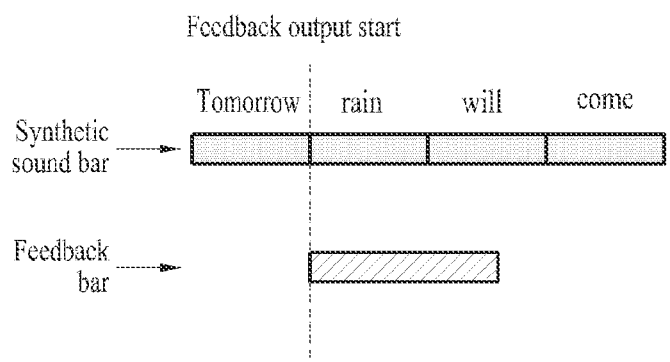
FIG. 7 is a diagram for one example to describe an output timing point of a core word and an output timing point of a feedback.
Figure 8:
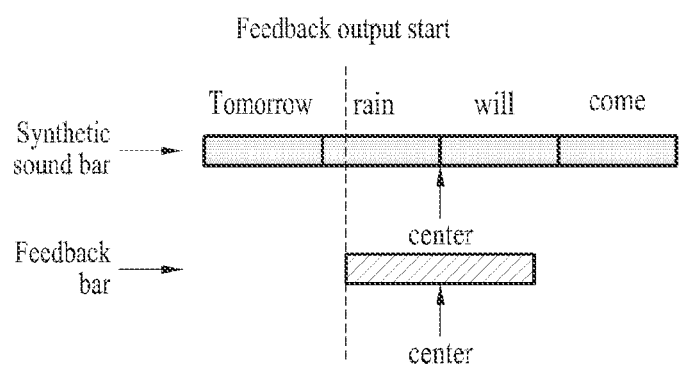
FIG. 8 is a diagram for another example to describe an output timing point of a core word and an output timing point of a feedback.

FIG. 7 and FIG. 8 are diagrams for examples of outputting a feedback in the course of outputting a synthetic sound of a natural language 'Tomorrow, rain will come'. In the example shown in FIG. 7, a synthetic sound bar is configured to indicate an output quantity of a synthetic sound. Each blocks configuring the synthetic sound bar shows one example of an output time of each letter when a natural language is converted to a sound. A feedback bar indicates an output quantity of the feedback and may be understood as having a different meaning in accordance with a type of the feedback. For instance, an output quantity of the feedback may mean at least one of a play time of a background sound, an image displayed time, a time for a brightness of the display unit 151 to gradually change until reaching a brightness target, a time for an output color of the display unit 151 to gradually change until reaching a color target, a time taken to maintain lighting of the light source unit, and a time taken for the light source unit to flicker as many times as a determined count.

For instance, in the example shown in FIG. 7, if a feedback is a background sound that representing 'raining sound', a core word matching the feedback may include 'rain'. Hence, referring to FIG. 7, the controller 180 may be able to control the feedback to be outputted in response to an output start point of the word 'rain' in the synthetic sound.

For another instance, referring to FIG. 8, the controller 180 may be able to control the feedback to be outputted while an output center point of the word 'rain' in the synthetic sound and a center point of the feedback are set to coincide with each other. In this case, the feedback may be outputted fore or after the word 'rain' is outputted as a sound.

On the other hand, unlike the example shown in FIG. 7, the controller 180 may control the feedback to be outputted in a manner that an end point of the output of the word 'rain' and an end point of the feedback are set to coincide with each other [not shown in the drawing].

As mentioned in the foregoing description of the above examples, the controller 180 extracts a core word matching a feedback and may then control an output timing point of the feedback to be adjusted to coincide with an output timing point of a speech corresponding to the extracted core word. If a core word corresponding to a feedback does not exist, it may be able to refer to an output point example 2 in the following description.

[Feedback Output Timing Point Example 2: Outputting Feedback to Match an Output of a Whole Synthetic Sound]

The controller 180 may control a feedback to be outputted to coincide with an output timing point of an output of a whole synthetic sound. In particular, the controller 180 may control a feedback to be outputted as soon as an output of a synthetic sound starts. Alternatively, the controller 180 makes an output center of a synthetic sound coincide with an output center of a feedback and may then control the feedback to be outputted. This will be described with reference to FIG. 9 and FIG. 10. For clarity of the following description, assume that a feedback includes a background sound that represents a traffic jam in the example shown in FIG. 9 or FIG. 10.

Figure 9:
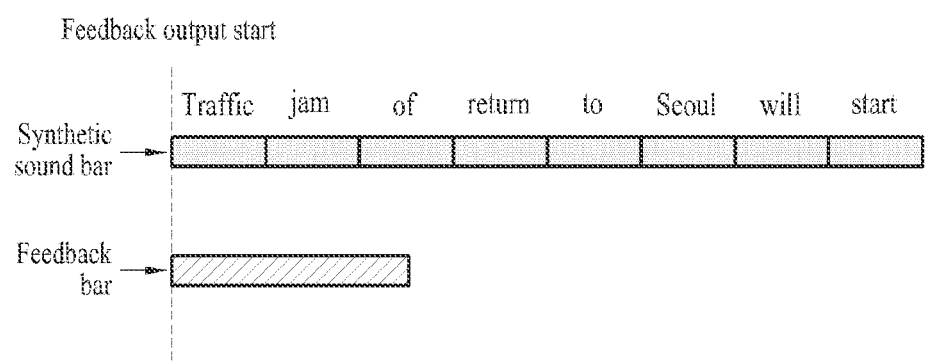
FIG. 9 is a diagram for one example to describe an output timing point of a synthetic word and an output timing point of a feedback.
Figure 10:
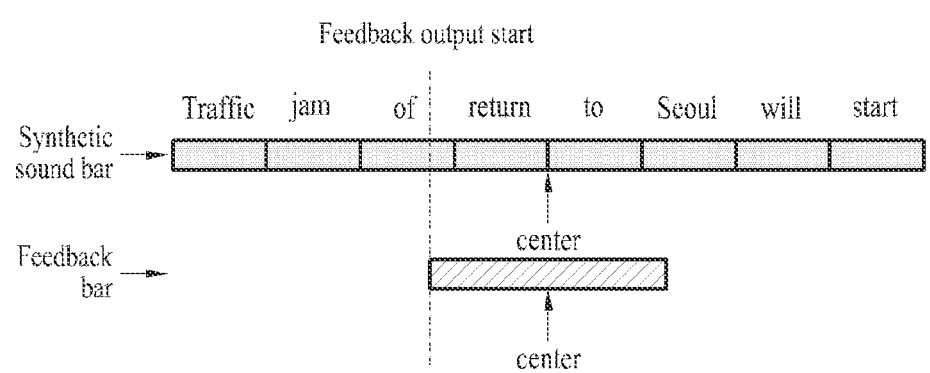
FIG. 10 is a diagram for another example to describe an output timing point of a synthetic word and an output timing point of a feedback.

FIG. 9 and FIG. 10 are diagrams for examples to describe that a feedback is outputted in the course of outputting a synthetic sound of a natural language 'Traffic jam of return to Seoul will start'. For instance, referring to FIG. 9, the controller 180 may be able to control a feedback to be outputted in a manner of being matched to an output start point of the synthetic sound.

For another instance, referring to FIG. 10, the controller 180 controls a center point of a total paly time of a synthetic sound to coincide with a center point of a total play time of a feedback and may be then able to control the feedback to be outputted.

On the other hand, unlike the example shown in FIG. 9, the controller 180 may control the feedback to be outputted in a manner that an output end point of the synthetic sound and an output end point of the feedback are set to coincide with each other [not shown in the drawing].

As mentioned in the description of the above example, the controller 180 may be able to control an output timing point of a feedback to be adjusted in a manner of being matched to an output timing point of a synthetic sound.

Whether a feedback will follow the feedback output timing point example 1 or the feedback output timing point example 2 may be determined in response to a user setting or a presence or non-presence of a core word matching the feedback. In case the feedback follows either the output timing point example 1 or the output timing point example 2, the feedback may need to be outputted before or after the synthetic word is outputted. For instance, if a total play time of the feedback is longer than that of the synthetic sound, the feedback may need to be outputted before or after an output of the synthetic sound. In such a situation, the controller 180 controls a silence period to be given to at least one of a period before an output start of a created synthetic sound and a period after an output completion of the synthetic sound, thereby controlling the feedback to be outputted in the course of playing the synthetic sound. In case that the silence period is added to the synthetic sound, a natural language may be outputted as a sound after the silence period of the synthetic sound has been ended. Yet, the feedback may keep being outputted despite that the silence period is being outputted. A process for adding a silence period ahead of/behind a synthetic sound may refer to FIG. 11.

Figure 11:
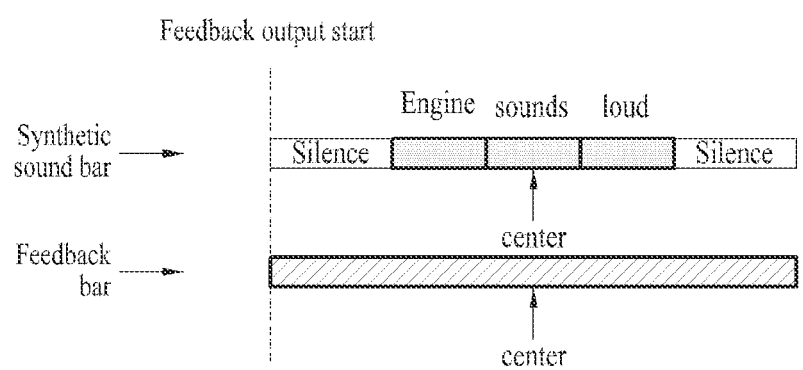
FIG. 11 is a diagram for one example to describe a process for adding silence periods before and after an output of a synthetic sound.

FIG. 11 is a diagram for one example to describe a process for adding silence periods before and after an output of a synthetic sound. In the example shown in FIG. 11, after a center point of a total play time of a synthetic sound has been set to coincide with a center point of a total paly time of a feedback, the feedback is outputted. In doing so, if the total play time of the feedback is greater than that of the synthetic sound, referring to FIG. 11, the controller 180 may be able to control silence periods to be added before and after the output of the created synthetic sound. If the silence periods are added before and after the created synthetic sound, the play time of the silence period added synthetic sound can be controlled to be equal to or greater than that of the feedback.

Like the example shown in FIG. 11, if the silence periods are added before and after the created synthetic sound, it may be able to prevent the feedback from being outputted while a synthetic sound having no relation to the feedback is being outputted. For instance, in case that the mobile terminal 100 needs to consecutively output a synthetic language of a first natural language by sentence unit and a synthetic language of a second natural language by sentence unit, a second feedback matching a meaning of the second natural language may need to be outputted instead of a first feedback matching a meaning of the first natural language while the synthetic language of the second natural language is being outputted. Hence, in order to prevent the second feedback matching the synthetic language of the second natural language or the meaning of the second natural language from being outputted in a manner of overlapping with the first feedback matching the meaning of the first natural language and to prevent the second feedback matching the meaning of the second natural language from being outputted in a manner of overlapping with the first feedback matching the synthetic language of the first natural language or the meaning of the first natural language, the controller 180 may be able to control the silence period to be given to the synthetic language of the first natural language or the synthetic language of the second natural language. Hence, while the synthetic language of the first natural language is outputted, the first feedback may be outputted only. While the synthetic language of the second natural language is outputted, the second feedback may be outputted only.

Although FIG. 11 shows that the silence periods are added to both sides of the created synthetic sound, respectively, the silence period may be added to one side of the created synthetic sound only.

In case that a feedback includes a background sound, the controller 180 controls a synthetic sound and the background sound to merge into one file and then outputs the merged audio file, thereby controlling a feedback to be outputted in the course of outputting the synthetic sound.

Referring now to FIG. 4, the controller 180 may be able to control a vibration accompanied by the feedback to be outputted while the feedback is outputted [S407]. In particular, in case that the feedback includes the background sound, the controller 180 may be able to control whether to output the vibration depending on a strength of the background sound.

A process for outputting a vibration in addition to a feedback is described in detail with reference to FIG. 12 as follows. First of all, assume that a feedback includes a background sound in FIG. 12.

Figure 12:
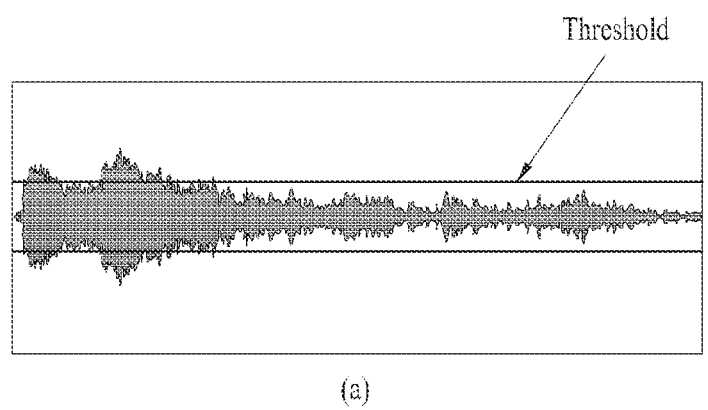
FIG. 12 is a diagram for one example to describe a process for outputting a vibration in the course of outputting a feedback.
Figure 12:
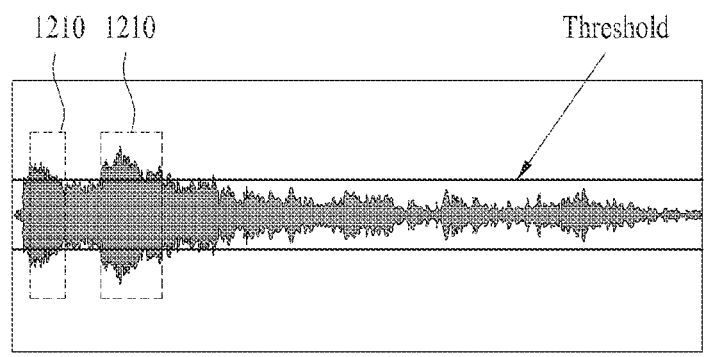

FIG. 12 is a diagram for one example to describe a process for outputting a vibration in the course of outputting a feedback. In particular, FIG. 12 shows that a waveform of a background sound is plotted in time domain. Referring to FIG. 12 (*a*), the controller 180 may be able to scan an interval in which an amplitude of a background sound is greater than a threshold by analyzing a waveform of the background sound. Subsequently, the controller 180 may be able to set an interval having an amplitude value greater than the threshold for a threshold time to an exceeding interval 1210. The controller 180 may control a vibration to be outputted while the exceeding interval of the feedback is outputted.

In this case, the threshold may include an average amplitude of the background sound, by which the present example may be non-limited. For instance, the controller 180 may be able to adjust a threshold based on a user setting value.

In case that the vibration is outputted while the exceeding interval 1210 of the feedback is outputted, the controller 180 may control a strength level of the vibration to be determined in response to a rate of a maximum amplitude value of the exceeding interval 1210 over the threshold. In particular, the controller 180 may be able to control the strength level of the vibration to be determined based on Formula 1 and Formula 2.

$$N_{level} = \text{Int}\left(\frac{\text{Local\_MaxAmp}}{\text{Threshold}}\right), \quad [\text{Formula 1}]$$
$$\text{if}\left(N_{Maxlevel} \geq \frac{\text{Global\_MaxAmp}}{\text{Threshold}}\right)$$

$$N_{level} = \text{Int}\left(\frac{1}{\text{Step}} \times \left(\frac{\text{Local\_MaxAmp}}{\text{Threshold}}\right)\right), \quad [\text{Formula 2}]$$
$$\text{if}\left(N_{Maxlevel} < \frac{\text{Global\_MaxAmp}}{\text{Threshold}}\right)$$

In Formula 1 or Formula 2, the $N_{level}$ may indicate a vibration strength level in a corresponding exceeding interval, the Int may indicate an integer function, the Local_Max Amp may indicate a maximum amplitude (hereinafter named a local maximum amplitude) in a corresponding exceeding interval, the Global_Max Amp may indicate a maximum amplitude in all exceeding intervals or a maximum amplitude in all waveforms of a background sound (hereinafter named a global maximum amplitude), the Threshold may indicate a threshold, and the $N_{Maxlevel}$ may indicate a maximum strength level of a settable vibration. The Step in Formula 2 is a function of the maximum strength level, global maximum amplitude and threshold of the vibration and may be defined by Formula 3.

$$\text{Step} = \frac{1}{N_{Maxlevel}} \times \text{Int}\left(\frac{\text{Global\_MaxAmp}}{\text{Threshold}}\right) \quad [\text{Formula 3}]$$

Regarding the determination of the vibration strength level with reference to Formula 1 and Formula 2, if a rate of a maximum amplitude over a threshold is equal to or smaller than a maximum strength level of a vibration [Formula 1], the controller 180 may be able to determine an integer ratio of a maximum amplitude to a threshold for each exceeding interval as a vibration strength level in the each exceeding interval. In particular, the controller 180 may be able to control a vibration on a strength level, which becomes higher if an exceeding interval has a higher maximum amplitude, to be outputted.

On the contrary, if a rate of a maximum amplitude over a threshold is greater than a maximum strength level of a vibration [Formula 2], the controller 180 may be able to determine an integer, which is extracted from a value resulting from multiplying an inverse number of the Step by a rate of a local maximum amplitude over a threshold, as a vibration strength level in each exceeding interval. If the rate of the local maximum amplitude over the threshold is greater than the maximum strength level of the vibration, it may be able to control a strength level of the vibration to be appropriately distributed in accordance with a real strength of an exceeding interval by multiplying the rate of the local maximum amplitude over the threshold by the inverse number of the Step. For instance, although the rate of the local maximum amplitude over the threshold is greater than the maximum strength level of the vibration in every exceeding interval, if Formula 1 is applied, the vibration strength level in very exceeding interval will be determined as the maximum strength level of the vibration. When Formula 2 is applied instead of Formula 1, even if the rate of the local maximum amplitude over the threshold in every exceeding interval is greater than the maximum strength level of the vibration, the vibration at the maximum strength level may not be outputted in every interval. In this case, a vibration will be outputted at a relatively smaller strength level in an interval having a relatively small value of a local maximum amplitude over a global maximum amplitude. In an interval having an equal value of a local maximum amplitude over a global maximum amplitude, a vibration can be outputted at a relatively greater strength level.

In the description of the step S404 shown in FIG. 4, the background sound or image may be selected as the feedback. In particular, the controller 180 may be able to extract the background sound or image matching the meaning of the natural language from the background sound or image database saved in the memory 180. In this case, the background sound database, from which the background sound will be extracted, may include a default background sound database and a user background sound database. And, the image database, from which the image will be extracted, may include a default image database and a user image database. For clarity of the following description, the background sound database or the image database shall be called a database, the default background sound database or the default image database shall be called a default database, and the user background sound database or the user image database shall be called a user database.

Figure 13:
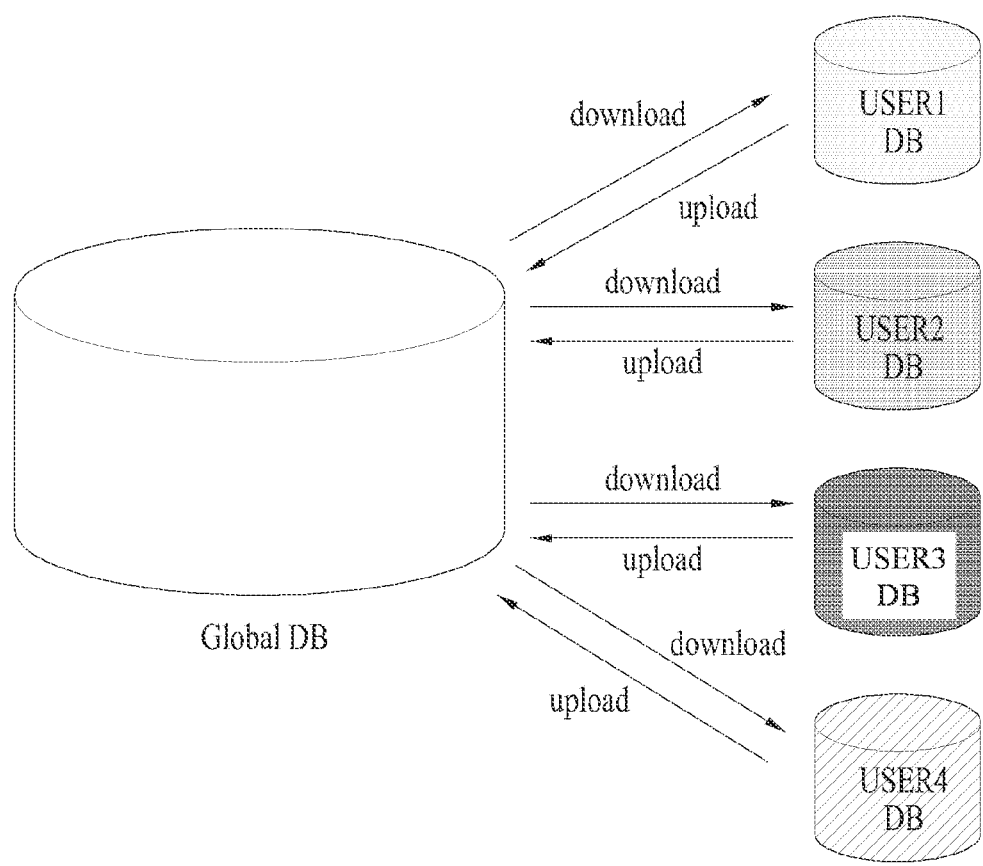
FIG. 13 is a diagram for one example to describe a process for sharing a user database with users.

The default database is the database configured to store a basically provided background sound or image. And, the user database may mean the database capable of configuring a user-desired background sound or image. The user database may be shared between users via web. For instance, FIG. 13 is a diagram for one example to describe a process for sharing a user database with users. A user is able to upload the database staved in the mobile terminal 100 of the user to a webserver including a global database. And, the user may be able to download a user database uploaded by a different user from the global database of the webserver. For instance, referring to FIG. 13, if databases of users 2 to 4 are uploaded to the global database, a user 1 may be able to download and use at least one of the databases of the users 2 to 3. In particular, the mobile terminal 100 may be able to update the user database through the global database.

In determining a feedback of a background sound or image matching a meaning of a natural language, it is not mandatory to use the background sound or image database saved in the memory 160. For another instance, the controller 180 accesses the global database or a different terminal via the wireless communication unit 110 and may be then able to externally receive a background sound or image matching a meaning of a natural language. In particular, the controller 180 accesses an external database via network connection and may be then able to receive such a feedback as a background sound, an image and the like.

As mentioned in the description of the example, in case that a plurality of databases is saved in the memory 160, the controller 180 may be able to extract background sounds or images in accordance with priorities of the databases. For instance, if a priority of the default database is higher than that of the user database, it may be able to attempt the extraction of a feedback from the user database only if the feedback matching a meaning of a natural language by sentence unit is not extractable from the default database.

In order to enable a user to edit the user database, the controller 180 may control a template configured to edit the user database to be displayed. In this case, the template may include an index item, a metadata item, and a data buffer item. The index item may be provided to record an index. And, words or meanings linked to a background sound or image may be recorded in the metadata item. Moreover, a background sound or image data may be recorded in the data buffer item.

For instance, in case that a background sound recorded in the data buffer item is 'raining sound', an index (e.g., a sequence in a database) may be recorded in the index item and the meanings associated with 'raining sound' (e.g., typhoon, rain, shower, rainy spell, etc.) may be recorded in the metadata item.

In editing the user database using a template, the controller 180 may be able to support at least one of a copy function, an exchange function, an add function, a link function and a download function. The copy function may be provided to bring data from a different database saved in the memory 160 and the exchange function may be provided to exchange a background sound or image file recorded in the database with a different file. The add function may be provided to add a new background sound or image unrecorded in the database. The link function may be provided to amend a content of the database through a linkage with a user database saved in an external terminal. And, the download function may be provided to configure a user database by downloading a database of a different user from a global database.

According to the former description with reference to FIG. 4, after the synthetic sound has been created by converting a natural language of a sentence unit to a sound [S402], the natural language meaning extracting step S403 and the step S404 of determining the feedback matching the natural language meaning proceed. Yet, it may be unnecessary for the step S403 and the step S404 to proceed after completion of the step S402. On the contrary, after either the step S403 or the step S404 has been ended, the step S402 may proceed or the steps S402 and S403 or the steps S402 and S404 may be simultaneously performed.

Accordingly, embodiments of the present invention provide various effects and/or features.

First of all, the present invention provides a mobile terminal by which user's convenience can be enhanced.

In particular, while a synthetic sound generated from converting a prescribed text to a sound is outputted via the mobile terminal, a feedback matching a meaning of the prescribed text is outputted, whereby a mobile terminal according to the present invention is able to effectively deliver a text meaning to a user.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
 a display unit configured to display a text corresponding to a sentence unit;
 an audio output module configured to output a synthetic sound generated from converting the text to a sound; and
 a controller configured to:
  generate the synthetic sound;
  extract a meaning of the text;
  cause a feedback to be output corresponding to the meaning of the text while the synthetic sound is output via the audio output module, wherein the feedback comprises a background sound of the synthetic sound;
  analyze a sound wave of the background sound and set an exceeding interval in which an amplitude of the sound wave is greater than a threshold, wherein the threshold comprises an average amplitude of the sound wave;
  cause a vibration to be output while the background sound is output, wherein the vibration is output when the exceeding interval is output via the audio output unit; and
  adjust an output strength of the vibration based on a rate between the average amplitude of the sound wave and a maximum amplitude in the exceeding interval.

2. The mobile terminal of claim 1, wherein the controller is further configured to cause the feedback to be output when an output of synthetic sound corresponding to a core word associated with the feedback is started.

3. The mobile terminal of claim 1, wherein the controller is further configured to add a silence period to at least before starting the output of the synthetic sound or after completion of the output of the synthetic sound if a play time of the feedback is longer than that of the synthetic sound,
 wherein a total play time of the silence period and the synthetic sound is equal to or greater than the play time of the feedback.

4. The mobile terminal of claim 1, wherein the output strength of the vibration is determined by formulas as follows:

$$N_{level} = \text{Int}\left(\frac{\text{Local\_MaxAmp}}{\text{Threshold}}\right),$$

if

-continued $$\left(N_{Maxlevel} \geq \frac{Global\_MaxAmp}{Threshold}\right);$$

$$N_{level} = Int\left(\frac{1}{Step} \times \left(\frac{Local\_MaxAmp}{Threshold}\right)\right),$$

if $$\left(N_{Maxlevel} < \frac{Global\_MaxAmp}{Threshold}\right);$$

and $$Step = \frac{1}{N_{Maxlevel}} \times Int\left(\frac{Global\_MaxAmp}{Threshold}\right)$$

wherein:

$N_{level}$ indicates a vibration strength level in the exceeding interval;

Int indicates an integer function;

Local_Max Amp indicates a maximum amplitude in the exceeding interval;

Threshold indicates a threshold; and $N_{Maxlevel}$ indicates a settable maximum vibration strength level.

5. The mobile terminal of claim 1, wherein the feedback further comprises displaying an image corresponding to the meaning of the text, and wherein the controller is further configured to cause the image to be displayed as a background screen of the display unit while the synthetic sound is output.

6. The mobile terminal of claim 1, wherein the controller is further configured to cause the feedback to be output in a manner of changing an output color of the display unit or adjusting a brightness of the display unit.

7. The mobile terminal of claim 1, wherein the feedback further comprises a flickering of a light source, and the light source comprises a camera flash configured to provide light.

8. A method of controlling a mobile terminal, the method comprising:

displaying a text corresponding to a sentence unit;

generating a synthetic sound by converting the text to a sound;

extracting a meaning of the text;

determining a feedback corresponding to the meaning of the text;

outputting the synthetic sound;

outputting the feedback while the synthetic sound is output, wherein the feedback comprises a background sound of the synthetic sound;

analyzing a sound wave of the background sound and setting an exceeding interval in which an amplitude of the sound wave is greater than a threshold, wherein the threshold comprises an average amplitude of the sound wave;

outputting a vibration while the background sound is output, wherein the vibration is output when the exceeding interval is output via an audio output unit; and adjusting an output strength of the vibration based on a rate between the average amplitude of the sound wave and a maximum amplitude in the exceeding interval.

* * * * *